(No Model.)  2 Sheets—Sheet 1.

H. M. PAINE.
ELECTRIC MOTOR.

No. 355,024. Patented Dec. 28, 1886.

WITNESSES
INVENTOR
Henry M. Paine
by A. M. Tanner
Attorney (No Model.) 2 Sheets—Sheet 2.

H. M. PAINE.
ELECTRIC MOTOR.

No. 355,024. Patented Dec. 28, 1886.

Witnesses
Edwin M. Wight
Benj. S. Morehouse

Inventor
Henry M. Paine

UNITED STATES PATENT OFFICE.

HENRY M. PAINE, OF NEWARK, NEW JERSEY.

ELECTRIC MOTOR.

SPECIFICATION forming part of Letters Patent No. 355,024, dated December 28, 1886.

Application filed September 28, 1885. Serial No. 178,371. (No model.) Patented in England November 26, 1875, No. 4,118, and in France December 1, 1875, No. 110,552.

*To all whom it may concern:*

Be it known that I, HENRY M. PAINE, a citizen of the United States, residing at Newark, in the county of Essex and State of New Jersey, have invented a new and useful Improvement in Regulators of Electro Magnetic Motors, of which the following is a specification, reference being had to the accompanying drawings, forming part of this specification.

The present invention relates to that class of electric motors in which a rotary movement is produced by electro-magnetic attractions between electro-magnets mounted radially on a revolving shaft, and armatures arranged around said electro-magnets on a stationary drum or frame, and used as the fulcrums of magnetic force.

In motors of the class mentioned a commutator is fixed on the revolving shaft carrying the electro-magnets, and by means of a contact device or brush the electric current is successively sent through the different electro-magnets, rendering them alternately active and passive, and producing between the armatures and magnets successive attractions, which tend to produce the necessary mechanical effect.

The invention consists in a special construction of commutator whereby the effects of sparking are diminished if not prevented, in order to guard against the oxidation or burning of the contacts, provision being also made for regulating the speed of the motor by devices capable of easy manipulation, all as will be hereinafter more fully described, and then set forth in the claims.

Figure 1:
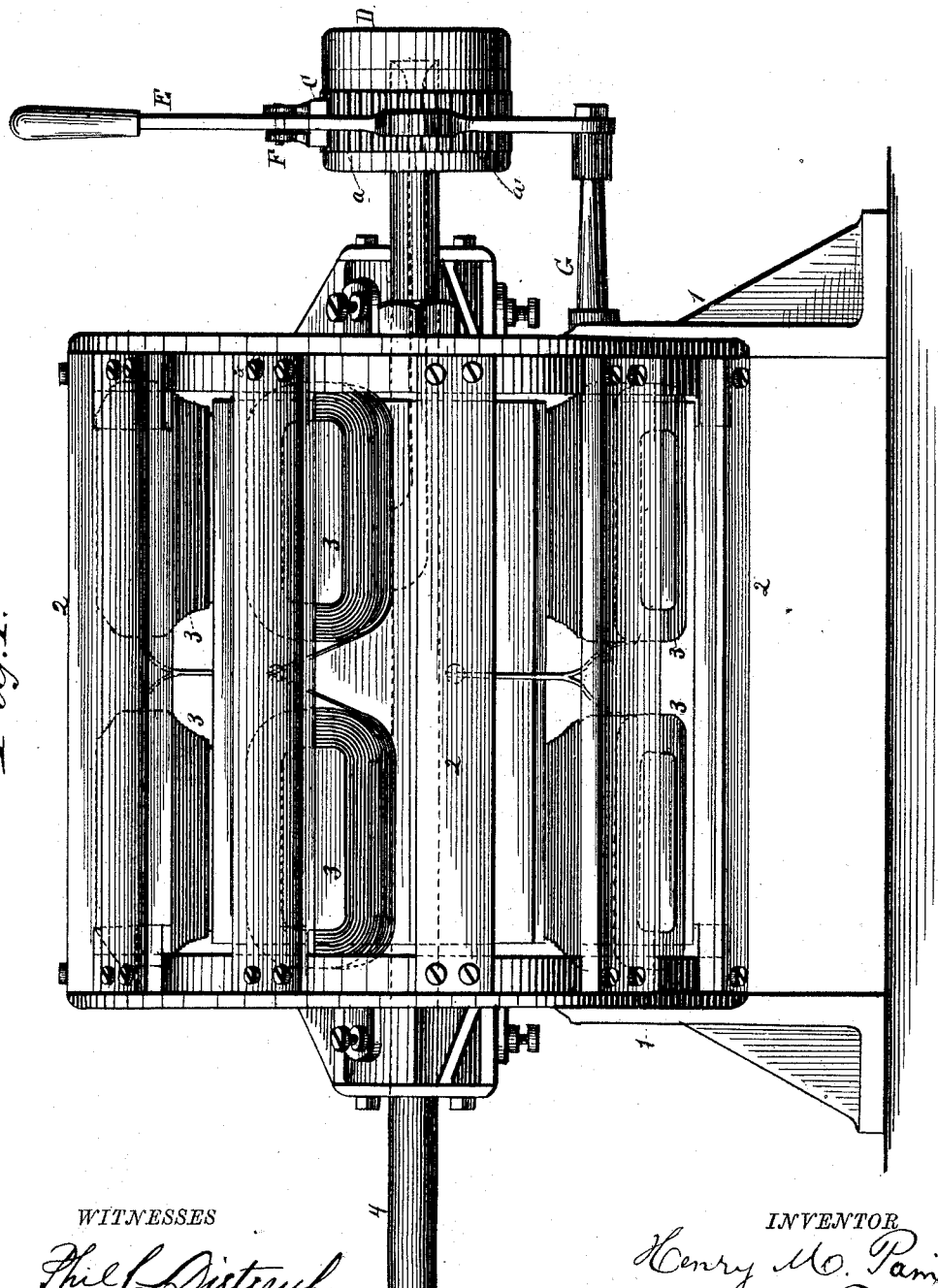
Figure 2:
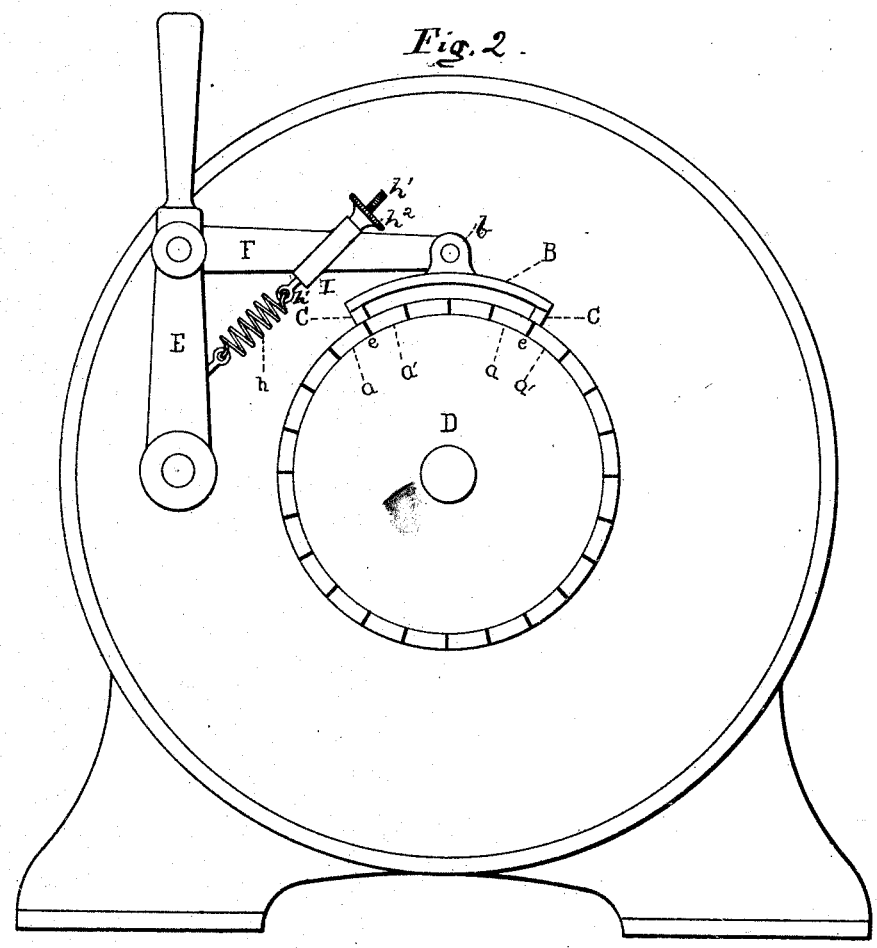

In the accompanying drawings, Figure 1 is a side elevation of an electric motor having my commutator and regulating devices applied thereto. Fig. 2 is a section through the current or commutator disk and showing the current-conveying bar and shoes and the shifting devices.

The reference-numeral 1 designates a frame or stand having circular end heads, to which are secured a series of longitudinal bars, 2, which, in connection with said end heads, comprise a skeleton or open-work drum or casing. The bars 2 are made of soft iron and constitute fixed armatures for a series of electro-magnets, 3, revolving within the drum or casing formed by the end heads and armature-bars.

The electro-magnets radiate from and are mounted on a central shaft or axis, 4, which is journaled in the end heads of the frame or casing 1. The electro-magnets co-operate with the fixed armatures, each of which may be termed a "fulcrum of electric force." To obtain a rotary movement by electro-magnetic attractions, a succession of electrical impulses are caused by a commutator mounted on the shaft or axis 4 in such a manner that before each electro-magnetic action the commutator closes the circuit of a battery or other source of electrical force and opens it after the effect is produced.

The commutator devices, which alone constitute my invention, include a current-disk, D, which is mounted on the axis 4, and has a number of metallic conducting strips or plates, $a$ and $a'$, and intervening insulating-spaces, $e$. The current-disk is of any approved construction or form, and, as is customary with motors possessing such current-disks, the conducting-strips are connected with one terminal of the battery and the respective electro-magnets. The other terminal of the battery or source of electrical force is connected with a bar, B, which conforms to the periphery of the current-disk, but does not come in contact therewith. The bar B has shoes or projections C on its ends which bear closely upon the current-disk, as is clearly seen in Fig. 2. The shoes or projections may be made separate from the bar B and secured thereto in any suitable manner; or else they may form an integral part of the bar. In either event the shoes or projections are curved to closely conform to the face of the current-disk. The bar B has ears $b$ on its upper side, between which is jointed a horizontal link or arm, F, having its other end jointed to a vertical lever, E. This lever is fulcrumed at its lower end upon an arm, G, extending from the frame of the motor, so that it can be freely vibrated by its handle end for shifting the bar B and its shoes C upon the current-disk. A tension-spring, $h$, having one end connected with the lever E and its other end attached to a screw-threaded rod, $h'$, capable of being adjusted in a socket, I, by a nut, $h^2$, serves as a medium for insuring a firm contact of the shoes C upon the current-disk.

It will be seen that the tension-spring and its adjusting devices cause the contact-shoes to be pressed forcibly upon the current-disk in order to avoid sparking, and obviously this firm contact can take place even though the shoes should wear away. It has been stated that one electrode of the battery is connected with the bar B. This has for its result the division of the electric current and its passage into two companion conducting strips of the commutator or current-disk. As the shoes C both offer the same resistance to the current, it is obvious that the latter is always evenly divided upon two strips belonging to the same electro-magnet, and, consequently, by such division of the current the effects of sparking on the commutator by currents of considerable intensity are either greatly diminished or entirely removed.

The bar B is of such a length and the contact-shoes thereon are of such a width that the latter will always bear upon two conducting-strips $a$, belonging to or connected with a particular electro-magnet of the series. Hence, as has already been stated, the current takes two paths in completing the circuit through the current-disk. As the latter revolves, and when the shoes reach the insulating-spaces and lap the same, as seen in Fig. 2, the current is gradually cut off from one magnet and gradually conveyed into one next brought into action.

Referring to Fig. 2, it may be stated that the letters $a$ and $a'$ represent the terminals of electrical coils in their order of action.

It is apparent that by shifting the bar B, through which the electric current is conveyed to the electro-magnets, the position of the shoes C relatively to the current-disk can be varied, whereby the speed of the motor can be regulated and its direction of rotation reversed.

Having thus described my invention, what I claim as new, and desire to secure by Letters Patent, is—

1. In an electric motor, the combination, with the electro-magnets, the armatures, the rotary shaft, and the commutator or current disk, of the rigid bar B, having shoes C, adapted to make contact with two companion conducting strips on the current-disk, and the lever and connecting-bar for shifting said bar and shoes, substantially as herein set forth.

2. In an electric motor, the combination of the hand-lever, the link, the adjustable tension-spring, and the rigid bar having curved end shoes, with the current-disk, and the electro-magnets and armatures, substantially as herein set forth.

HENRY M. PAINE.

Witnesses:
EDWIN M. WIGHT,
BENJ. S. MOREHOUSE.